United States Patent

[11] 3,622,116

| [72] | Inventor | Leonard F. Fellows<br>65 Commodore Road, Chappaque, N.Y. 10514 |
|---|---|---|
| [21] | Appl. No. | 11,102 |
| [22] | Filed | Feb. 13, 1970 |
| [45] | Patented | Nov. 23, 1971 |

[54] NONTILT PICTURE HANGER
11 Claims, 13 Drawing Figs.

[52] U.S. Cl. .................................................. 248/467, 248/224
[51] Int. Cl. .................................................. A47j 7/14
[50] Field of Search .................................... 248/467, 489, 497, 498, 475, 224; 287/20.925

[56] References Cited
UNITED STATES PATENTS

| 859,013 | 7/1907 | Roberts et al. | 248/224 |
| 2,032,636 | 3/1936 | Seckinger | 220/3.9 |
| 2,588,009 | 3/1952 | Jones | 248/489 |
| 2,723,815 | 11/1955 | Browning | 248/467 |
| 3,298,655 | 1/1967 | Palm | 248/498 |
| 3,394,712 | 7/1968 | Herr et al. | 248/224 X |

FOREIGN PATENTS

| 593,348 | 10/1947 | Great Britain | 248/498 |

Primary Examiner—William H. Schultz
Attorney—Curtis Ailes

ABSTRACT: A tongue member with tapered sides is arranged for attachment to the back surface of a picture to be hung. A bracket member defining a socket for the tongue is arranged for attachment to a picture-supporting surface. The socket has sides tapered at the same angle as the tapered sides of the tongue to engage securely therewith when the tongue is inserted into the socket.

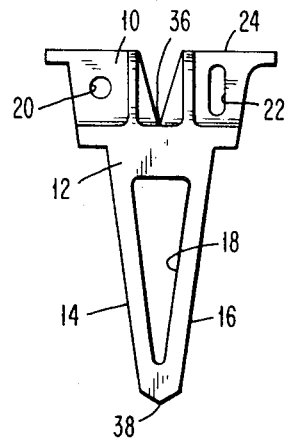
FIG. 1
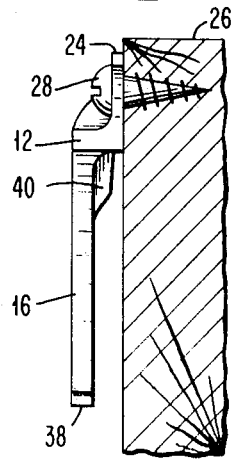
FIG. 2
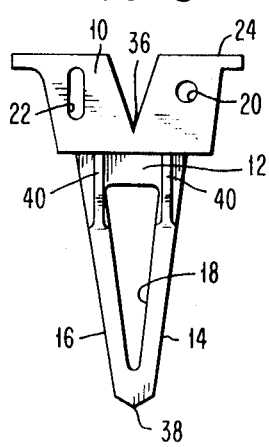
FIG. 3
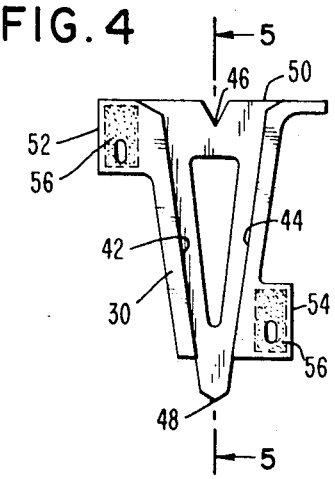
FIG. 4
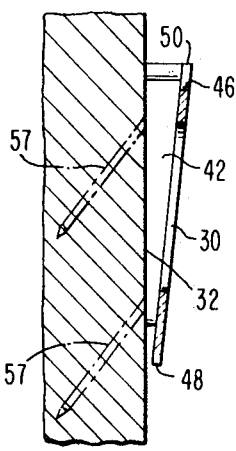
FIG. 5
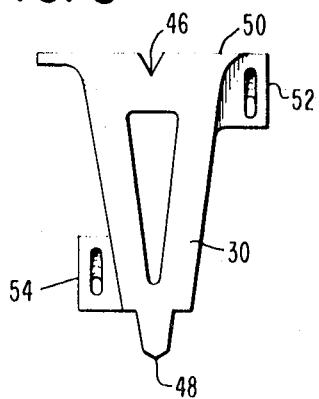
FIG. 6
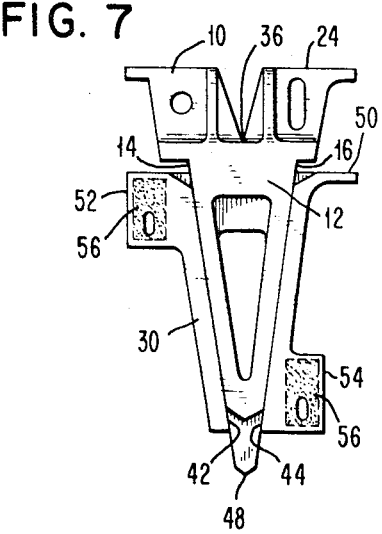
FIG. 7
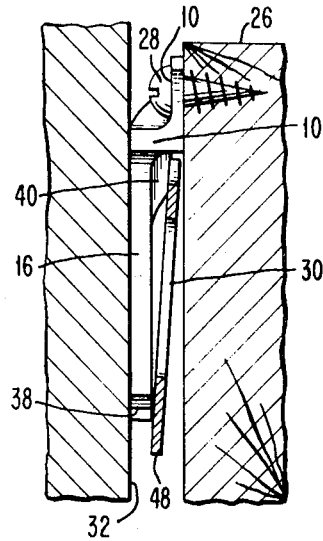
FIG. 8
INVENTOR
LEONARD F. FELLOWS
BY
ATTORNEY

PATENTED NOV 23 1971 3,622,116

NONTILT PICTURE HANGER

This invention relates to a device for hanging articles such as pictures and mirrors upon a supporting surface such as a wall.

A continuing problem in hanging mirrors and pictures by conventional means is that they are susceptible to becoming tilted upon their hangers. Most pictures are hung in a delicate balance in leveling which may be upset by any disturbance. Such a disturbance may include mechanical vibration, a breeze blowing through the room, any inadvertent bumping of the picture, or any handling of the picture such as for dusting. If the weight of the picture is only very slightly unbalanced on its hanging means, the slightest disturbance causes it to tilt so that it is not level.

Accordingly, it is a major object of the present invention to provide a picture hanger device which prevents the picture from tilting.

Another object of the invention is to provide a picture hanger device which provides a permanent leveling of the hung picture after the initial installation, even if the picture is repeatedly removed and rehung.

Another object of the invention is to provide a picture hanger device which is very inexpensive and yet easy to install and which provides ease of operation in hanging the picture.

Further objects and advantages of the invention will be apparent from the following description and the accompanying drawings.

In carrying out the invention, there may be provided a picture hanger device including a tongue member having a tongue with tapered sides, and a bracket member defining a socket for the tongue. The socket has sides tapered at the same angle as the tapered sides of the tongue to engage securely therewith. One of the members is arranged for attachment to the back surface of the picture and the other one of said members is arranged for attachment to a picture-supporting surface.

In the accompanying drawings:

FIGS. 1, 2, and 3 are respectively rear, side, and front views of a tongue member which forms a portion of the preferred form of picture hanger device in accordance with the present invention.

FIGS. 4, 5, and 6 are respectively rear, side, and front views of a bracket member which forms the other portion of the preferred picture hanger device in cooperation with the tongue member of FIGS. 1, 2, and 3. The side view of FIG. 5 is shown partially in section.

FIGS. 7 and 8 are rear and side views respectively showing the tongue member of FIG. 1 and the bracket member of FIG. 4 in assembled relationship.

Figure 9:
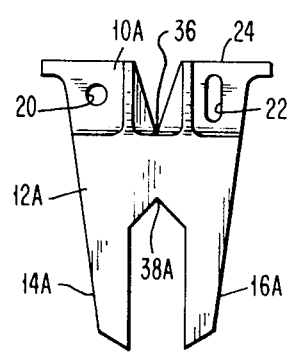
FIGS. 9 and 10 are respectively rear and side views of a tongue member forming a portion of an alternative form of the invention.

The preferred form of the invention shown in FIGS. 1 through 8 includes a tongue member 10, as shown in FIG. 1, arranged to be attached to a picture frame 26, as shown in the side view of FIG. 2. The device also includes a bracket member 30, as shown in FIG. 4, which is arranged to be attached to a supporting surface 32, as illustrated in FIG. 5. In use, the tongue 12 of the tongue member 10 is lowered into the socket formed by the bracket member 30 so that the two members are in the assembled relationship illustrated in FIGS. 7 and 8, thereby supporting the picture frame 26 upon the supporting surface 32. Both members are preferably molded from a high-strength plastic such as one of the nylon plastics.

Referring particularly to FIG. 1, tongue member 10 includes a flat tongue 12 having tapered sides 14 and 16. To save material, and to make the structure of the tongue lighter, the tongue may be provided with a cutout central section as indicated at 18. At the top of the tongue member, there are provided mounting holes 20 and 22. The mounting hole 22 is slotted in order to permit rotational adjustment for leveling of the tongue member. The upper edge 24 of the tongue member is perpendicular to the centerline of the member so as to provide a profile line by means of which the tongue member may be perfectly aligned horizontally with the upper edge of a picture frame to which the tongue member may be attached. FIG. 1 is referred to as a rear view of the tongue member because the tongue is attached to the rear upper edge of a picture frame which is to be hung by means of the device, and FIG. 1 shows the aspect of the tongue member seen when viewed in the installed position at the rear of the picture frame which it is to support.

FIG. 2 is a side view of the tongue member of FIG. 1 illustrating further details of construction, and also showing how the tongue member is attached at the upper edge of a picture frame 26 (shown in section) by means of screws 28 extending through the mounting holes 20 and 22. FIG. 2 also illustrates that the tongue has an essentially flat profile when viewed from the side.

In order to provide greater ease and convenience in mounting the tongue member at the center of the picture frame 26, as further shown in FIG. 1, the tongue member is provided with upper profile edge portions which converge at the centerline at a point 36. Similarly, at the lower tip of the tongue 12 there are provided profile edge portions converging at a point 38 at the centerline of the member. Thus, in attaching the tongue member, the horizontal center of the picture is preferably measured and marked on the back of the picture frame. If practical, a vertical line may be drawn through the center mark, and the centerline index points 36 and 38 may be used to align the tongue member vertically along that line. Otherwise, the center point 36 is used alone to determine the horizontal position of the tongue member, and the alignment of the tongue member is determined by aligning the upper edge 24 with the upper edge of the picture frame 26. A wood screw is first inserted and fastened in the unslotted mounting hole 20, and then a second screw is inserted and tightened in the center of the slotted mounting hole 22 to determine the exact alignment of the tongue member. Both screws are then finally tightened and the mounting of the tongue member is thus complete.

As illustrated in FIG. 2, the front of the tongue 12 is provided with protruding ribs 40 at the upper portion thereof. The purpose of these ribs will be described more fully below.

FIG. 3 is a front view of the tongue member 10 which further shows the construction of the rib members 40.

FIG. 4 shows a bracket member 30 which defines a socket for receiving the tongue 12 of the tongue member 10 of FIG. 1. The socket has tapered sides at 42 and 44 which are tapered at the same angle as the tapered sides 14 and 16 of the tongue 12. In order to provide for ease of mounting of the bracket member 30 upon a supporting surface, this member includes profile surfaces at the upper edge 50 converging to a point 46 at the centerline of the member. Similar profile surfaces converge to a point 48 at the lower tip at the centerline of the member. These points can be lined up at a vertical line marked upon the supporting surface to thereby level the bracket member as it is mounted. The bracket member also includes an extended horizontal upper profile edge 50 which can be aligned with a horizontal line on the supporting surfaces. A widened entrance is provided at the tip of the socket by outwardly flared surfaces which match the angles of the surfaces at the tip 38 of the tongue.

The bracket member 30 includes flat fastening surfaces, as indicated at 52 and 54, by means of which the bracket member is attached to the supporting surface. Fastening surfaces 52 and 54 are preferably provided with pressure-sensitive adhesive material 56 by means of which the bracket member is initially positioned and attached to the supporting surface. Nails are then applied through the nail hole openings illustrated at the fastening surfaces 52 and 54 and preferably angled downwardly into the supporting surface, as indicated at 57 in FIG. 5.

FIG. 5 is a side view taken at a section "5—5" through the centerline of the bracket member of FIG. 4. FIG. 5 illustrates that the socket defined by the bracket member 30 is wider at the top than it is at the bottom in order to provide for ease of insertion of the tongue 12 into the bracket member 30. The back of the socket is open, being closed by the mounting surface 32.

FIG. 6 is a front view of the bracket member of FIG. 4. FIG. 6 particularly illustrates the preferred configuration of the nail holes through the mounting surfaces 52 and 54, the nail holes being formed with a downwardly tapered upper surface and a lower surface which is horizontal. Therefore, these openings are easily molded, while permitting angular entry of the nails through the nail holes and into the supporting surface.

FIG. 7 illustrates the tongue 12 of the tongue member 10 in assembled relationship in the socket defined by the bracket member 30. The tapered sides 14 and 16 of the tongue 12 fit snugly against the tapered sides 42 and 44 of the socket. The tongue member does not bottom on any other portion of the bracket member so that substantially the entire support of the tongue member upon the bracket member is accomplished at these tapered surfaces.

FIG. 8 is a side view, corresponding to the side views of FIG. 2 and FIG. 5, showing the tongue member and the bracket member in the assembled relationship. FIG. 8 particularly illustrates that the function of the ribs 40 at the upper front surface of the tongue 12 is to provide an effective thickening of the tongue at the upper end of the tongue, which may be referred to as the base of the tongue. This provides a close fit between the base of the tongue and the upper portion of the socket defined by bracket 30, even though the socket is open more at the top to permit easy insertion of the tongue therein. The front surfaces of the ribs are slanted to conform to the cooperating surface of the socket. Also, the thickness of the tip portion of the tongue at 38 is preferably sufficient to provide a close fit in the bottom of the socket.

Figure 10:
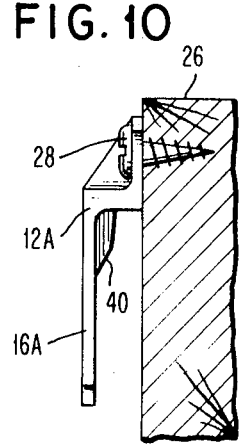
Figure 11:
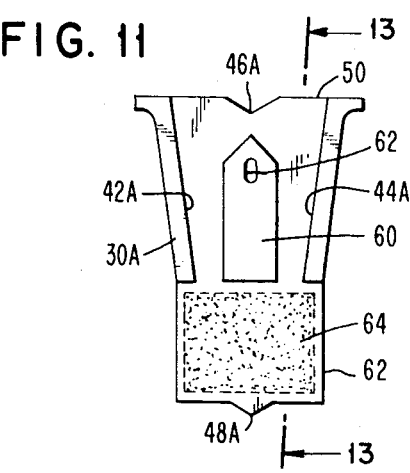
FIG. 11 is a rear view of a bracket member designed for assembly with the tongue member of FIG. 9 and forming the other portion of the alternative form of the invention.
Figure 12:
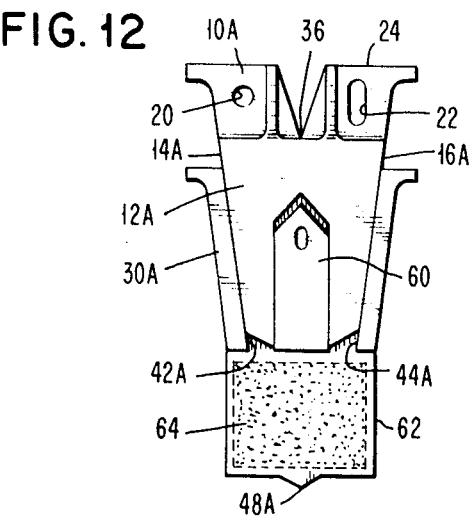
FIGS. 12 and 13 are respectively rear and side views showing the tongue member of FIG. 9 and the bracket member of FIG. 11 in assembled relationship.
Figure 13:
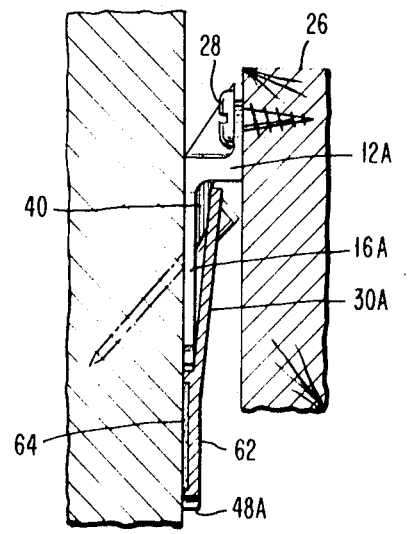

FIGS. 9 through 13 illustrate another embodiment of the present invention. FIGS. 9 and 10 are rear and side views corresponding to the views of FIGS. 1 aNd 2 illustrating the tongue member of the modification of the invention. FIG. 11 corresponds to FIG. 4 and shows a rear view of the bracket member of the modification of the invention. FIGS. 12 and 13 correspond generally to FIGS. 7 and 8 and respectively shown assembled back and side views of the modification of the invention. In FIG. 13, the bracket 30A is shown at a section "13—13" as indicated in FIG. 11. In FIGS. 9 through 13, the same numbers used in FIGS. 1 through 8 have been used to designate specific parts of the device whenever those parts correspond directly. When the parts are similar, the same numbers as used in FIGS. 1 through 8 have been used, together with the suffix letter A.

As clearly shown in the rear view of the tongue in FIG. 9, the most striking difference in the tongue member of this modification is that the tongue 12A is split, having a center slot formed therein which terminates in a vertical index point 38A defined by converging profile surfaces.

As shown in FIG. 11, the bracket member of this modification includes a center divider 60, and the two sides of the tongue 12A of FIG. 9 straddle this center divider in the assembled position as illustrated in FIG. 12. The center divider 60 may be said to divide the socket defined by bracket member 30A into two separate pockets. THe center divider 60 also defines a through-hole 62 for receiving a nail for attachment of the bracket member to a picture-supporting surface. At the bottom of the bracket member there is provided a large flat fastening surface portion 62 which is preferably provided with a pressure-sensitive adhesive material 64 which is arranged to face the supporting surface and adhere thereto. The bracket is thus held to the supporting surface by a combination of the pressure-sensitive adhesive 64 and a nail which is applied through opening 62. The bracket is thus fixed and stabilized in a vertically aligned position by these two fastening means.

As previously suggested with respect to the first embodiment of the invention, the bracket of FIG. 11 is preferably mounted by first fastening it to the supporting surface by means of the pressure-sensitive adhesive 64 alone. By this means, the position and leveling of the bracket is determined accurately. THe nail is then applied through the opening 62 in order to make the fastening more secure. The embodiment of FIGS. 9 through 13 provides the advantage that only one nail is required so as to minimize the permanent marking of the wall with nail holes. Also, the installation is simplified to the extent that only one nail need be driven. It is generally intended that the embodiment of FIGS. 9 through 13 should be produced in a smaller size than the embodiment of FIGS. 1 through 8, and that it should have a lower limit of picture-supporting weight capacity. However, the same general principles of operation are present. Thus, the tongue member is supported principally at the tapered side surfaces 14A and 16A, the inner edges of the split portions of the tongue preferably do not fit tightly against the sides of the center divider 60 as the tongue is inserted into the socket.

WIth either of the embodiments described above, if it is determined, after installation, that either the socket member or the bracket member have been attached in such a way as to cause the picture to be initially tilted, then the picture may be removed and the tongue member screws may be loosened and the tongue member rotated as permitted by the slotted screw hole 22 sufficient to provide the necessary adjustment for perfect leveling of the picture. From that time on, the picture is held in perfect horizontal alignment and if it is necessary to remove the picture for dusting, or for any other purpose, it is automatically placed in perfect alignment whenever it is rehung. This result is achieved because of the engagement of the tapered sides 14 and 16 of the tongue with the tapered sides 42 and 44 of the socket. It has been determined that if the angle between the two tapered sides 14 and 16 of the tongue is sufficiently narrow, preferably in the neighborhood of 20° or less, the tongue is held very securely in the socket and there can be no rocking motion of the picture supported by the tongue in the socket. Thus, the picture is held in perfect alignment. It is essential for accomplishing this result that substantially the entire weight of the picture must be supported at the tapered side edges 14 and 16 of the tongue. The preferred angle between the tapered side edges 14 and 16 is about 17°.

While all of the above description contemplates a tongue member for attachment to a picture frame, and a bracket member for attachment to a supporting surface, such as a wall, it is apparent that these parts may be interchanged if desired. Thus, the tongue member may be attached to the wall in a position to extend upward, and the bracket member may be attached to a picture frame with the opening of the socket defined by the bracket member extending downwardly. The picture may then be hung by placing the bracket over the tongue. However, the arrangement with the tongue attached to the picture frame is preferred.

The pressure-sensitive adhesive 56 employed in the attachment of the bracket member of FIG. 4, and the pressure-sensitive adhesive 64 employed in the attachment of the bracket member of FIG. 11 are preferably protected by a film of paper or plastic which is pealed away from the adhesive just before the bracket is applied to the wall. As an alternative to providing the adhesive 56 or 64 as an initial component of the respective bracket members, separate patches of double-sided pressure-sensitive adhesive may be applied to each of the brackets by the user at the time of attachment to the supporting surface.

While this invention has been shown and described in connection with particular preferred embodiments, various alternations and modifications will occur to those skilled in the art. Accordingly, the following claims are intended to define the valid scope of this invention over the prior art, and to cover all changes and modifications falling within the true spirit and valid scope of this invention.

I claim:

1. A picture hanger device comprising
a tongue member having a tongue with tapered sides, a bracket member defining a socket for said tongue, said socket having sides tapered at the same angle as the tapered sides of said tongue to engage securely therewith, said tongue member being arranged for attachment to the back surface of a picture and said bracket member being arranged for attachment to a picture-supporting surface, said tongue being split and said socket including two separate pockets for the separate split portions of said tongue, said bracket member including a center divider dividing said socket into two separate pockets for the two separate split portions of said tongue.

2. A device as claimed in claim 1 wherein the angle between said tapered sides of said tongue is about 17°.

3. A device as claimed in claim 1 wherein the angle between said tapered sides of said tongue is less than 20°.

4. A device as claimed in claim 1 wherein the engagement of said tapered sides of said tongue with said tapered sides of said socket provides substantially the entire support between said members.

5. A device as claimed in claim 1 wherein each of said members is substantially symmetrical with respect to a centerline, and wherein each of said members includes a substantially horizontal upper marginal edge and profile edge portions converging to points at the vertical centerlines thereof to provide for precise horizontal and vertical alignment during attachment thereof.

6. A device as claimed in claim 1 wherein said bracket member includes at least one flat fastening surface, and a coating of pressure-sensitive adhesive material attached to said flat fastening surface and arranged to engage and adhere to the picture-supporting surface.

7. A device as claimed in claim 1 wherein said tongue member includes two horizontally disposed screw holes, one of said screw holes being slotted in a vertical direction to permit a rotational adjustment in the mounting of said tongue member.

8. A device as claimed in claim 1 wherein said divider portion of said bracket member defines a through-hole for receiving a nail for attachment of said bracket member to a picture-supporting surface.

9. A device as claimed in claim 8 wherein the lower portion of the surface of said bracket member is provided with pressure-sensitive adhesive on the side thereof facing the picture-supporting surface to provide an additional means of attachment thereto.

10. A device as claimed in claim 1 wherein the socket-defining portion of said bracket member is open at the side facing the surface to which said bracket member is to be attached, the surface to which said bracket member is to be attached serving to close the open portion of said socket.

11. A device as claimed in claim 1 wherein said tongue is relatively thinner at the tip and thicker at the base of the tongue, said socket being provided with a corresponding dimensional difference to thereby provide a close fit between said members in the assembled position while permitting ease of insertion of said tongue into said socket.

* * * * *